(12) United States Patent
Gerke et al.

(10) Patent No.: US 9,546,344 B2
(45) Date of Patent: Jan. 17, 2017

(54) COLOR-PROTECTING DETERGENT

(71) Applicant: Henkel AG & Co. KGaA, Duesseldorf (DE)

(72) Inventors: Thomas Gerke, Duesseldorf (DE); Mareile Job, Leverkusen (DE); Birgit Gluesen, Duesseldorf (DE); Benoit Luneau, Ratingen (DE); Christian Kropf, Hilden (DE); Boerje Sellergren, Helsingborg (SE); Mohamad Wasim Almozaik, Dortmund (DE); Robert Sulc, Corona Del Mar, CA (US)

(73) Assignee: Henkel AG & Co. KGaA, Duesseldorf (DE)

( * ) Notice: Subject to any disclaimer, the term of this patent is extended or adjusted under 35 U.S.C. 154(b) by 0 days.

(21) Appl. No.: 14/837,949

(22) Filed: Aug. 27, 2015

(65) Prior Publication Data

US 2015/0368590 A1 Dec. 24, 2015

Related U.S. Application Data

(63) Continuation of application No. PCT/EP2014/052981, filed on Feb. 17, 2014.

(30) Foreign Application Priority Data

Mar. 1, 2013 (DE) .................. 10 2013 203 484

(51) Int. Cl.
| | | |
|---|---|---|
| *C11D 1/00* | (2006.01) | |
| *C11D 3/37* | (2006.01) | |
| *C11D 3/40* | (2006.01) | |
| *B08B 3/04* | (2006.01) | |
| *C11D 3/00* | (2006.01) | |
| *C08F 222/10* | (2006.01) | |

(52) U.S. Cl.
CPC ....... *C11D 3/0021* (2013.01); *C08F 222/1006* (2013.01); *C11D 3/3757* (2013.01); *C08F 2222/1013* (2013.01)

(58) Field of Classification Search
CPC ............... C11D 1/00; C11D 3/37; C11D 3/40; B08B 3/04
See application file for complete search history.

(56) References Cited

U.S. PATENT DOCUMENTS

| | | |
|---|---|---|
| 5,542,951 A | 8/1996 | Antwerpen et al. |
| 5,627,151 A | 5/1997 | Detering et al. |
| 5,677,384 A | 10/1997 | Detering et al. |
| 5,846,924 A | 12/1998 | Detering et al. |
| 5,880,252 A | 3/1999 | Kim et al. |
| 2008/0044830 A1 | 2/2008 | Tovar et al. |
| 2010/0036188 A1 | 2/2010 | Steinfeld et al. |

FOREIGN PATENT DOCUMENTS

| | | | |
|---|---|---|---|
| DE | 2814287 A1 | 10/1979 | |
| DE | 2814329 A1 | 10/1979 | |
| DE | 3803630 A1 | 8/1989 | |
| EP | 0135217 A1 | 3/1985 | |
| EP | 0262897 A2 | 4/1988 | |
| WO | 94/02579 A1 | 2/1994 | |
| WO | 94/26796 A1 | 11/1994 | |
| WO | 95/03382 A1 | 2/1995 | |
| WO | 95/03388 A1 | 2/1995 | |
| WO | 95/06098 A1 | 3/1995 | |
| WO | 95/06100 A1 | 3/1995 | |
| WO | WO 2014/102209 * | 7/2014 | ............. C08G 77/26 |

OTHER PUBLICATIONS

Kyzas et al, "Selective separation of basic and reactive dyes by molecularly imprinted polymers", Chemical Engineering Journal, vol. 149, pp. 263-272, 2009 (no month given).*
PCT International Search Report (PCT/EP2014/052981) dated Apr. 29, 2014.
Kyzas et al., "Selective Separation of Basic and Reactive Dyes by Molecularly Imprinted Polymers (MIPs)", Chemical Engineering Journal, vol. 149, pp. 263-272, 2009.

* cited by examiner

*Primary Examiner* — Brian P Mruk
(74) *Attorney, Agent, or Firm* — Thomas G. Krivulka

(57) ABSTRACT

The color protection properties of detergents when used to wash colored textiles is to be improved. This is substantially achieved in that polymers are used which are molecularly imprinted using dyes.

6 Claims, No Drawings

COLOR-PROTECTING DETERGENT

FIELD OF THE INVENTION

The present invention generally relates to the use of certain molecularly imprinted polymers as dye transfer-inhibiting active substances in the washing of textiles, to detergents containing said polymers, and to the molecularly imprinted polymers.

BACKGROUND OF THE INVENTION

In addition to components essential for the washing process, such as surfactants and builder materials, detergents generally contain further ingredients that can be grouped together under the term of washing auxiliaries and thus comprise various groups of active substances, such as foam regulators, graying inhibitors, bleaching agents, bleach activators, and enzymes. Such auxiliaries also include substances that are intended to prevent dyed textiles from having a changed color appearance after washing. This change in color appearance of washed, i.e., clean textiles may be due to, on the one hand, dye components being removed from the textile by the washing process ("fading"), and, on the other hand, dyes dissolving out from textiles of a different color being deposited on the textile ("discoloration"). The discoloration aspect can also play a role in the case of undyed laundry items when these are washed together with colored laundry items. In order to prevent these undesired side effects of removing dirt from textiles by treatment with aqueous systems typically containing surfactants, detergents, especially when they are provided as so-called color detergents for washing colored textiles, contain active ingredients that are intended to stop the dissolution of dyes from the textile or at least to prevent the deposition of dissolved-out dyes present in the washing liquor onto textiles. Many of the typically used polymers have such a high affinity for dyes that they draw them to a greater extent from the dyed fiber, such that greater color losses occur.

Dye transfer-preventing polyvinylpyrrolidones with molecular weights of 15,000 g/mol to 50,000 g/mol are known from the European patent application EP 0 262 897 and those with molecular weights over 1,000,000 g/mol from the international patent application WO 95/06098. The N-vinylimidazole/N-vinylpyrrolidone copolymers known from the German patent application DE 28 14 287 or DE 38 03 630 or the international patent applications WO 94/10281, WO 94/26796, WO 95/03388, and WO 95/03382, polyvinyloxazolidones known from the German patent application DE 28 14 329, the copolymers based on vinyl monomers and carboxylic acid amides known from the European patent application EP 610 846, pyrrolidone group-containing polyesters and polyamides known from the international patent application WO 95/09194, the grafted polyamidoamines and polyethylenimines known from the international patent application WO 94/29422, the polymers with amide groups from secondary amines known from the German patent application DE 43 28 254, and the polyamine-N-oxide polymers known from the international patent application WO 94/02579 or the European patent application EP 0 135 217 have also been proposed as dye transfer-preventing active substances.

It was now found surprisingly that certain polymers, defined below, lead to unexpectedly high color transfer inhibitions when used in detergents if the polymerization for producing the polymers is carried out in the presence of a dye.

Furthermore, other desirable features and characteristics of the present invention will become apparent from the subsequent detailed description of the invention and the appended claims, taken in conjunction with the accompanying drawings and this background of the invention.

BRIEF SUMMARY OF THE INVENTION

Use of polymers, molecularly imprinted using dyes, of ethylenically unsaturated monomers for preventing the transfer of textile dyes from colored textiles to undyed or differently colored textiles, when washed together, particularly in surfactant-containing aqueous solutions.

Use of polymers, molecularly imprinted using dyes, of ethylenically unsaturated monomers for preventing the change in the color appearance of colored textiles when washed particularly in surfactant-containing aqueous solutions.

A method for washing textiles in surfactant-containing aqueous solutions, characterized in that a surfactant-containing aqueous solution is used that contains a polymer, molecularly imprinted using dyes, of ethylenically unsaturated monomers.

A detergent, containing a polymer, molecularly imprinted using dyes, of ethylenically unsaturated monomers.

A molecularly imprinted polymer obtainable by molecular imprinting with the dyes Acid Blue 113 and/or indigo during the free-radical polymerization of the monomers methacrylic acid and ethylene glycol dimethacrylate or the monomers N,N-dimethylaminoethyl methacrylate and ethylene glycol dimethacrylate or the monomers methyl methacrylate and ethylene glycol dimethacrylate.

DETAILED DESCRIPTION OF THE INVENTION

The following detailed description of the invention is merely exemplary in nature and is not intended to limit the invention or the application and uses of the invention. Furthermore, there is no intention to be bound by any theory presented in the preceding background of the invention or the following detailed description of the invention.

The problem addressed by the invention is the use of polymers, molecularly imprinted using dyes, of ethylenically unsaturated monomers for preventing the transfer of textile dyes from colored textiles to undyed or differently colored textiles, when washed together, particularly in surfactant-containing aqueous solutions.

A molecular imprinting typically comprises the following steps: (1) a template compound, which can be the target molecule or a structural analogue thereof, is brought into contact with a functional monomer or a plurality of monomers in solution, so that a template-monomer complex forms; (2) the template-monomer complex is polymerized, optionally together with other, optionally cross-linked monomers, so that a polymer matrix with the template compound contained therein forms; (3) the template compound is removed from the polymer matrix, particularly by extraction, so that the molecularly imprinted polymer remains. If the molecularly imprinted polymer accumulates as a solid, optionally a grinding or sieving process can be introduced after or preferably before step (3) in order to obtain the molecularly imprinted polymer with a desired particle size and particle size distribution.

The polymers used according to the invention are preferably obtainable by free-radical polymerization of mono- or polyethylenically unsaturated mono-, di-, or tricarboxylic acids, which include in particular acrylic acid, methacrylic acid, ethacrylic acid, dimethylacrylic acid, maleic acid, methylenemalonic acid, crotonic acid, fumaric acid, itaconic acid, sorbic acid, angelic acid, cinnamic acid, styrylacrylic acid, citraconic acid, glutaconic acid, aconitic acid, phenylacrylic acid, vinylbenzoic acid, and mesaconic acid, and mixtures thereof, and/or esters thereof such as, for example, 2-hydroxyethyl methacrylate, N,N-diethylaminoethyl methacrylate, ethylene glycol dimethacrylate, trimethylolpropane trimethacrylate, and pentaerythritol triacrylate. If desired, one or more of the additional monomers without a carboxylic acid or ester functionality such as, for example, acrylamide, methacrylamide, 2-vinylpyridine, 4-vinylpyridine, N,N,N-trimethyl-N-(4-vinylbenzyl)ammonium chloride, vinylpyrrolidone, vinylimidazole, N-benzyl-N'-vinylimidazolinium bromide, divinylbenzene, methylenebisacrylamide, styrene, cyanostyrene, and acrylonitrile, and mixtures thereof can be used.

It is essential that the free-radical polymerization is carried out in the presence of at least one dye in order to imprint the polymers molecularly. After the polymerization, the dye is removed from the molecularly imprinted polymer.

The dyes used in fiber and textile manufacture may be suitable for molecular imprinting. The molecular imprinting is carried out in particular with azo dyes such as, for example, Disperse Yellow 8, Disperse Yellow 64, and Disperse Black 2, reactive dyes such as, for example, Reactive Black 5, Reactive Red 35, Reactive Orange 96, Reactive Yellow 17, and Reactive Red 194, direct dyes such as, for example, Direct Orange 29, Direct Black 22, Direct Red 80, Direct Red 84, Direct Red 194, Direct Red 81, Direct Red 32, Direct Blue 162, Direct Blue 159, Direct Violet 9, and Pigment Red 38, and pigment dyes such as, for example, indigo, Pigment Orange 5, Pigment Orange 13, Pigment Yellow 154, and Pigment Red 184, and mixtures thereof. Preferably, at least one dye from the class of azo dyes is used for molecular imprinting. Crystal Blue, indigo, and mixtures thereof are also preferably used for molecular imprinting.

The dye in the free-radical polymerization is preferably used in amounts from 0.1 mol % to 20 mol %, particularly 1 mol % to 10 mol %, based on the sum of the monomers.

Preferably, acrylic acid, methacrylic acid, maleic acid, or salts, particularly alkali salts, or esters, particularly alkyl and/or hydroxyalkyl esters, of these acids, and maleic anhydride, and mixtures thereof are used for preparing the polymers. In a further preferred embodiment, in addition at least diethylenically unsaturated, cross-linking monomers are present in the polymerization.

Preferred polymers include the polymerization products obtainable by free-radical polymerization of alkyl or hydroxyalkyl esters, particularly methyl, ethyl, hydroxyethyl, or hydroxypropyl esters, the aforementioned unsaturated carboxylic acids, particularly acrylic acid or methacrylic acid, and the copolymerization products of the aforementioned acids with the aforementioned esters. Especially preferred are copolymers of hydroxyethyl methacrylate and methacrylic acid. Preferred embodiments of the polymers used according to the invention include those which are present cross-linked during the polymerization because of the presence of polyunsaturated, particularly diunsaturated monomers, particularly ethylene glycol dimethacrylate.

The polymerization can be carried out from solution, as a precipitation, emulsion, or suspension polymerization and, if two or more monomers are present, as a random or block copolymerization.

Further subjects of the invention are the molecularly imprinted polymers obtainable by molecular imprinting with the dyes Acid Blue 113 and/or indigo during the free-radical polymerization of the monomers methacrylic acid and ethylene glycol dimethacrylate or the monomers N,N-dimethylaminoethyl methacrylate and ethylene glycol dimethacrylate or the monomers methyl methacrylate and ethylene glycol dimethacrylate.

The prevention of the staining of white or also differently colored textiles by dyes washed out of textiles is particularly pronounced. The dye transfer-inhibiting molecularly imprinted polymers make a contribution to both aforementioned aspects of color consistency; in other words, they prevent both discoloration and fading, although the staining prevention effect, particularly when washing white textiles, is the most pronounced. Further subjects of the invention, therefore, are the use of the aforementioned molecularly imprinted polymers to prevent the change in the color appearance of textiles when washed particularly in surfactant-containing aqueous solutions, and detergents containing the aforementioned molecularly imprinted polymers. The change in the color appearance is thereby not to be understood as the difference between the soiled and clean textile, but rather the difference between the clean textile before and after washing. It can be considered a further advantage that the aforementioned molecularly imprinted polymers have an especially pronounced color-protecting effect in the case of textiles made of synthetic fibers or cotton and prevent staining of textiles made of synthetic fibers or cotton or with a proportion of synthetic fibers or cotton. The dye transfer inhibitors according to the invention are therefore used preferably to prevent the dye transfer to textiles made of synthetic fibers or cotton or with a proportion of synthetic fibers or cotton.

A further subject of the invention is a method for washing colored textiles in surfactant-containing aqueous solutions, which is characterized in that a surfactant-containing aqueous solution is used that contains an aforementioned molecularly imprinted polymer. The method in its simplest form is realized in that textiles requiring cleaning are brought into contact with the aqueous liquor, whereby a conventional washing machine is used or the washing can be performed by hand. It is possible in a method of this type to wash white or undyed textiles together with the colored textile, without the white or undyed textile being stained.

Apart from the aforementioned dye transfer-inhibiting molecularly imprinted polymer, a detergent, which preferably contains it in amounts from 0.01% by weight to 5% by weight, particularly from 0.02% by weight to 2% by weight, can contain customary ingredients compatible with this compound. Thus, it can contain, for example, in addition a further dye transfer inhibitor, preferably in amounts from 0.1% by weight to 2% by weight, particularly 0.2% by weight to 1% by weight, which in a preferred embodiment is selected from the polymers of vinylpyrrolidone, vinylimidazole, and vinylpyridine-N-oxide, or the copolymers thereof. Usable are both polyvinylpyrrolidones with molecular weights from 15,000 g/mol to 50,000 g/mol and polyvinylpyrrolidones with higher molecular weights of, for example, up to over 1,000,000 g/mol, particularly from 1,500,000 g/mol to 4,000,000 g/mol, N-vinylimidazole/N-vinylpyrrolidone copolymers, polyvinyloxazolidones, copolymers based on vinyl monomers and carboxylic acid amides, pyrrolidone group-containing polyesters and polyamides, grafted polyamidoamines and polyethylenimines, polyamine-N-oxide polymers and polyvinyl alcohols. However, enzymatic systems comprising a peroxidase and hydrogen peroxide or a substance yielding hydrogen peroxide in water can also be used. The addition of a mediator compound for peroxidase, for example, an acetosyringone, a phenol derivative, or a phenothiazine or phenoxazine, is preferred in this case, whereby the aforementioned polymeric dye transfer inhibitor active ingredients can also be used in addition. Polyvinylpyrrolidone preferably has an average molar mass in the range from 10,000 g/mol to 60,000 g/mol, particularly in the range from 25,000 g/mol to 50,000 g/mol. Of the copolymers, those consisting of vinylpyrrolidone and vinylimidazole in a molar ratio of 5:1 to 1:1 and having an average molar mass in the range from 5000 g/mol to 50,000 g/mol, particularly 10,000 g/mol to 20,000 g/mol, are preferred. In preferred embodiments, the detergents are free of such additional dye transfer inhibitors, however.

Detergents, which can be particularly powdered solids, in consolidated particle form, homogeneous solutions or suspensions, may contain in principle all known ingredients typical in such detergents, in addition to the active ingredient used according to the invention. The detergents according to the invention can contain in particular builder substances, surface-active surfactants, bleaching agents based on organic and/or inorganic peroxygen compounds, bleach activators, water-miscible organic solvents, enzymes, sequestering agents, electrolytes, pH regulators, and further auxiliaries such as optical brighteners, graying inhibitors, foam regulators, dyes, and fragrances.

The detergents preferably can contain one or more surfactants, whereby in particular anionic surfactants, nonionic surfactants, and mixtures thereof, but also cationic, zwitterionic, and amphoteric surfactants are suitable.

Suitable nonionic surfactants are in particular alkyl glycosides and ethoxylation and/or propoxylation products of alkyl glycosides or linear or branched alcohols each having 12 to 18 C atoms in the alkyl part and 3 to 20, preferably 4 to 10 alkyl ether groups. Furthermore, corresponding ethoxylation and/or propoxylation products of N-alkylamines, vicinal diols, fatty acid esters, and fatty acid amides, which in terms of the alkyl part correspond to the cited long-chain alcohol derivatives, and of alkyl phenols having 5 to 12 C atoms in the alkyl group can be used.

Preferably used as nonionic surfactants are alkoxylated, advantageously ethoxylated, particularly primary alcohols having preferably 8 to 18 C atoms and on average 1 to 12 mol of ethylene oxide (EO) per mole of alcohol, in which the alcohol group can be linear or preferably methyl-branched in the 2-position, or can contain linear and methyl-branched groups in the mixture, as they are conventionally present in oxo alcohol groups. Alcohol ethoxylates with linear groups of alcohols of native origin having 12 to 18 C atoms, e.g., from coconut, palm, tallow fatty, or oleyl alcohol, and on average 2 to 8 EO per mole of alcohol are preferred in particular, however. Preferred ethoxylated alcohols include, for example, $C_{12}$-$C_{14}$ alcohols with 3 EO or 4 EO, $C_9$-$C_{11}$ alcohols with 7 EO, $C_{13}$-$C_{15}$ alcohols with 3 EO, 5 EO, 7 EO, or 8 EO, $C_{12}$-$C_{18}$ alcohols with 3 EO, 5 EO, or 7 EO, and mixtures thereof, such as mixtures of $C_{12}$-$C_{14}$ alcohol with 3 EO and $C_{12}$-$C_{18}$ alcohol with 7 EO. The indicated degrees of ethoxylation represent statistical averages, which for a specific product can be an integer or a fractional number. Preferred alcohol ethoxylates have a narrow homolog distribution (narrow range ethoxylates, NRE). In addition to these nonionic surfactants, fatty alcohols with more than 12 EO can also be used. Examples of these are (tallow) fatty alcohols with 14 EO, 16 EO, 20 EO, 25 EO, 30 EO, or 40 EO. In detergents for use in machine methods in particular, extremely low-foaming compounds are conventionally used. These preferably include $C_{12}$-$C_{18}$ alkyl polyethylene glycol-polypropylene glycol ethers each having up to 8 mol of ethylene oxide and propylene oxide units in the molecule. However, other known, low-foaming, nonionic surfactants can also be used such as, for example, $C_{12}$-$C_{18}$ alkyl polyethylene glycol-polybutylene glycol ethers each having up to 8 mol of ethylene oxide and butylene oxide units in the molecule, as well as end-capped alkyl polyalkylene glycol mixed ethers. Hydroxyl group-containing alkoxylated alcohols, so-called hydroxy mixed ethers, are also particularly preferred. The nonionic surfactants also include alkyl glycosides of the general formula $RO(G)_x$, in which R represents a primary straight-chain or methyl-branched aliphatic group, particularly methyl-branched in the 2-position, having 8 to 22, preferably 12 to 18 C atoms, and G stands for a glycose unit having 5 or 6 C atoms, preferably glucose. The degree of oligomerization x, which indicates the distribution of monoglycosides and oligoglycosides, is any number—which as a quantity determined by analysis can also assume fractional values—between 1 and 10; x is preferably 1.2 to 1.4. Likewise suitable are polyhydroxy fatty acid amides of the formula

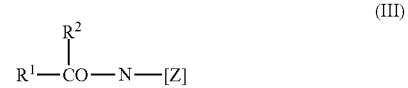

(III)

in which $R^1CO$ stands for an aliphatic acyl group having 6 to 22 carbon atoms, $R^2$ stands for hydrogen, or an alkyl or hydroxyalkyl group having 1 to 4 carbon atoms, and [Z] stands for a linear or branched polyhydroxyalkyl group having 3 to 10 carbon atoms and 3 to 10 hydroxyl groups.

The polyhydroxy fatty acid amides preferably derive from reducing sugars having 5 or 6 carbon atoms, in particular from glucose. The group of polyhydroxy fatty acid amides also includes compounds of the formula

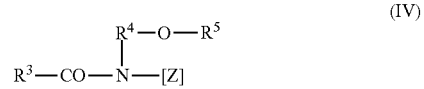

(IV)

in which $R^3$ stands for a linear or branched alkyl or alkenyl group having 7 to 12 carbon atoms, $R^4$ stands for a linear, branched, or cyclic alkylene group or an arylene group having 2 to 8 carbon atoms, and $R^5$ stands for a linear, branched, or cyclic alkyl group or an aryl group or an oxyalkyl group having 1 to 8 carbon atoms, $C_1$-$C_4$ alkyl or phenyl groups being preferred, and [Z] stands for a linear polyhydroxy alkyl group, the alkyl chain of which is substituted with at least two hydroxyl groups, or alkoxylated, preferably ethoxylated or propoxylated derivatives of said group. [Z] here as well is obtained preferably by reductive amination of a sugar such as glucose, fructose, maltose, lactose, galactose, mannose, or xylose. The N-alkoxy- or N-aryloxy-substituted compounds can be converted into the desired polyhydroxy fatty acid amides by reaction with fatty acid methyl esters in the presence of an alkoxide as the catalyst. A further class of preferably used nonionic surfactants, which are used either as the only nonionic surfactant or in combination with other nonionic surfactants, especially together with alkoxylated fatty alcohols and/or alkyl glycosides, is alkoxylated, preferably ethoxylated, or ethoxylated and propoxylated fatty acid alkyl esters, preferably having 1 to 4 carbon atoms in the alkyl chain, especially fatty acid methyl esters. Nonionic surfactants of the amine oxide type, such as N-coco alkyl-N,N-dimethylamine oxide and N-tallow alkyl-N,N-dihydroxyethylamine oxide, and fatty acid alkanolamides can also be suitable. The amount of these nonionic surfactants is preferably no more than that of the ethoxylated fatty alcohols, particularly no more than half thereof. So-called gemini surfactants may be suitable as additional surfactants. These are generally understood to be compounds that have two hydrophilic groups per molecule. As a rule, these groups are separated from one another by means of a so-called "spacer." This spacer is normally a carbon chain, which should be long enough for the hydrophilic groups to be far enough apart so that they can act independently of one another. Such surfactants generally have the characteristic feature of having an unusually low critical micelle concentration and the ability to greatly reduce the surface tension of water.

In exceptional cases the term gemini surfactants refers not only to such "dimeric" surfactants, but also correspondingly to "trimeric" surfactants. Suitable gemini surfactants are, for example, sulfated hydroxy mixed ethers or dimer alcohol bis- and trimer alcohol tris-sulfates and ether sulfates. End-capped dimer and trimer mixed ethers are characterized in particular by their bi- and multifunctionality. Thus the cited end-capped surfactants have good wetting characteristics and are low-foaming, making them particularly suitable for use in machine washing or cleaning methods. Gemini polyhydroxy fatty acid amides or poly-polyhydroxy fatty acid amides can also be used, however.

Suitable anionic surfactants are in particular soaps and those containing sulfate or sulfonate groups. Preferably suitable as surfactants of the sulfonate type are $C_9$-$C_{13}$ alkyl benzene sulfonates, olefin sulfonates, i.e., mixtures of alkene and hydroxyalkane sulfonates and disulfonates, as are obtained, for example, from $C_{12}$-$C_{18}$ monoolefins with a terminal or internal double bond by sulfonation with gaseous sulfur trioxide and subsequent alkaline or acidic hydrolysis of the sulfonation products. Alkane sulfonates obtained from $C_{12}$-$C_{18}$ alkanes, for example, by sulfochlorination or sulfoxidation with subsequent hydrolysis or neutralization are also suitable. The esters of α-sulfofatty acids (ester sulfonates), for example, the α-sulfonated methyl esters of hydrogenated coconut, palm kernel, or tallow fatty acids, which are produced by α-sulfonation of the methyl esters of fatty acids of plant and/or animal origin with 8 to 20 C atoms in the fatty acid molecule and subsequent neutralization to yield water-soluble mono salts, may also be considered suitable. Preferably these are the α-sulfonated esters of hydrogenated coconut, palm, palm kernel, or tallow fatty acids, it also being possible for sulfonation products of unsaturated fatty acids, for example, oleic acid, to be present in small amounts, preferably in amounts of no more than approximately 2 to 3% by weight. Preferred in particular are α-sulfofatty acid alkyl esters having an alkyl chain with no more than 4 C atoms in the ester group, for example, methyl ester, ethyl ester, propyl ester, and butyl ester. The methyl esters of α-sulfofatty acids (MES), but the saponified disalts thereof as well, are used particularly advantageously. Further suitable anionic surfactants are sulfated fatty acid glycerol esters, which are mono-, di- and triesters and mixtures thereof, as are obtained during preparation by esterification by a monoglycerol with 1 to 3 mol of fatty acid or on transesterification of triglycerides with 0.3 to 2 mol of glycerol. Preferred as alk(en)yl sulfates are the alkali salts and in particular the sodium salts of sulfuric acid half-esters of $C_{12}$-$C_{18}$ fatty alcohols, for example, prepared from coconut fatty alcohol, tallow fatty alcohol, lauryl, myristyl, cetyl, or stearyl alcohol, or $C_{10}$-$C_{20}$ oxo alcohols and the half-esters of secondary alcohols of this chain length. Furthermore, alk(en)yl sulfates of the stated chain length which contain a synthetic linear alkyl group prepared on a petrochemical basis and which exhibit degradation behavior similar to that of the appropriate compounds based on fatty chemical raw materials are preferred. In particular, $C_{12}$-$C_{16}$ alkyl sulfates and $C_{12}$-$C_{15}$ alkyl sulfates, as well as $C_{14}$-$C_{15}$ alkyl sulfates, are preferred because of their washing characteristics. 2,3-Alkyl sulfates, which may be obtained as commercial products of Shell Oil Company under the name DAN®, are also suitable anionic surfactants. The sulfuric acid monoesters of linear or branched $C_7$-$C_{21}$ alcohols, ethoxylated with 1 to 6 mol of ethylene oxide, are also suitable, such as 2-methyl-branched $C_9$-$C_{11}$ alcohols with on average 3.5 mol of ethylene oxide (EO) or $C_{12}$-$C_{18}$ fatty alcohols with 1 to 4 EO. Preferred anionic surfactants also include the salts of alkylsulfosuccinic acid, which are also called sulfosuccinates or sulfosuccinic acid esters, and are the monoesters and/or diesters of sulfosuccinic acid with alcohols, preferably fatty alcohols and in particular ethoxylated fatty alcohols. Preferred sulfosuccinates contain $C_8$ to $C_{18}$ fatty alcohol groups or mixtures thereof. Particularly preferred sulfosuccinates contain a fatty alcohol group derived from ethoxylated fatty alcohols, which are in themselves nonionic surfactants. In this case, sulfosuccinates whose fatty alcohol groups derive from ethoxylated fatty alcohols with a narrow homologue distribution are particularly preferred. It is likewise also possible to use alk(en)ylsuccinic acid having preferably 8 to 18 carbon atoms in the alk(en)yl chain or the salts thereof. Fatty acid derivatives of amino acids, for example, of N-methyltaurine (taurides) and/or of N-methylglycine (sarcosides) may be considered as further anionic surfactants. Sarcosides or sarcosinates are particularly preferred in this case and here most especially sarcosinates of higher and optionally mono- or polyunsaturated fatty acids such as oleyl sarcosinate. Soaps in particular may be suitable as further anionic surfactants. Saturated fatty acid soaps are suitable in particular, such as the salts of lauric acid, myristic acid, palmitic acid, stearic acid, hydrogenated erucic acid, and behenic acid and in particular soap mixtures derived from natural fatty acids, for example, coconut, palm kernel, or tallow fatty acids. Known alkenyl-succinic acid salts may also be used together with these soaps or as substitutes for soaps.

The anionic surfactants, including the soaps, may be present in the form of the sodium, potassium, or ammonium salts thereof and as soluble salts of organic bases, such as mono-, di-, or triethanolamine. The anionic surfactants are preferably present in the form of the sodium or potassium salts thereof, in particular in the form of the sodium salts. Surfactants are contained in detergents in proportions from normally 1% by weight to 50% by weight, in particular from 5% by weight to 30% by weight.

A detergent preferably contains at least one A detergent preferably contains at least one water-soluble and/or water-insoluble, organic and/or inorganic builder. The water-soluble organic builder substances include polycarboxylic acids, in particular citric acid and sugar acids, monomeric and polymeric aminopolycarboxylic acids, in particular glycine diacetic acid, methyl glycine diacetic acid, nitrilotriacetic acid, iminodisuccinates, and ethylenediamine-N,N'-disuccinic acid and hydroxyiminodisuccinate, ethylenediaminetetraacetic acid, as well as polyaspartic acid, polyphosphonic acids, in particular aminotris(methylenephosphonic acid), ethylenediaminetetrakis(methylenephosphonic acid), lysine tetra(methylene phosphonic acid), and 1-hydroxyethane-1,1-diphosphonic acid, polymeric hydroxy compounds such as dextrin and polymeric (poly) carboxylic acids, in particular the polycarboxylates obtainable by oxidation of polysaccharides, polymeric acrylic acids, methacrylic acids, maleic acids, and mixed polymers thereof, which may also contain small proportions of polymerizable substances without a carboxylic acid functionality incorporated therein by polymerization. The average relative molecular mass of the homopolymers of unsaturated carboxylic acids is in general between 5000 g/mol and 200,000 g/mol, and that of the copolymers between 2000 g/mol and 200,000 g/mol, preferably 50,000 g/mol to 120,000 g/mol, in each case based on free acid. One particularly preferred acrylic acid/maleic acid copolymer has an average relative molecular mass of 50,000 to 100,000. Suitable, albeit less preferred compounds of this class are copolymers of acrylic acid or methacrylic acid with vinyl ethers, such as vinyl methyl ethers, vinyl esters, ethylene, propylene, and styrene, the acid fraction of which amounts to at least 50% by weight. Terpolymers containing as monomers two unsaturated acids and/or the salts thereof and, as a third monomer, vinyl alcohol and/or a vinyl alcohol derivative or a carbohydrate may also be used as water-soluble organic builder substances. The first acidic monomer or the salt thereof is derived from a monoethylenically unsaturated $C_3$-$C_8$ carboxylic acid and preferably from a $C_3$-$C_4$ monocarboxylic acid, in particular from (meth)acrylic acid. The second acidic monomer or the salt thereof may be a derivative of a $C_4$-$C_8$ dicarboxylic acid, maleic acid being particularly preferred. The third monomer unit in this case is formed by vinyl alcohol and/or preferably an esterified vinyl alcohol. Vinyl alcohol derivatives which represent an ester of short-chain carboxylic acids, for example, of $C_1$-$C_4$ carboxylic acids, with vinyl alcohol, are especially preferred. Preferred polymers in this case contain 60% by weight to 95% by weight, particularly 70% by weight to 90% by weight of (meth)acrylic acid or (meth)acrylate, especially preferably acrylic acid or acrylate, and maleic acid or maleate, and 5% by weight to 40% by weight, preferably 10% by weight to 30% by weight of vinyl alcohol and/or vinyl acetate. Very especially preferred in this case are polymers in which the weight ratio of (meth)acrylic acid or (meth)acrylate to maleic acid or maleate is between 1:1 and 4:1, preferably between 2:1 and 3:1, and particularly 2:1 and 2.5:1. In this case, both the amounts and the weight ratios are based on the acids. The second acidic monomer or salt thereof can also be a derivative of an allyl sulfonic acid, which is substituted in the 2-position with an alkyl group, preferably with a $C_1$-$C_4$ alkyl group, or an aromatic group, derived preferable from benzene or benzene derivatives. Preferred terpolymers in this case contain 40% by weight to 60% by weight, particularly 45 to 55% by weight of (meth)acrylic acid or (meth)acrylate, especially preferably acrylic acid or acrylate, 10% by weight to 30% by weight, preferably 15% by weight to 25% by weight of methallyl sulfonic acid or methallyl sulfonates, and as the third monomer 15% by weight to 40% by weight, preferably 20% by weight to 40% by weight of a carbohydrate. Said carbohydrate in this case can be, for example, a mono-, di-, oligo-, or polysaccharide, mono-, di-, or oligosaccharides being preferred. Saccharose is especially preferred. Predetermined breaking points, which are responsible for the good biodegradability of the polymer, are presumably incorporated into the polymer by the use of the third monomer. These terpolymers generally have an average relative molecular mass between 1000 g/mol and 200,000 g/mol, preferably between 200 g/mol and 50,000 g/mol. Further preferred copolymers are those preferably having acrolein and acrylic acid/acrylic acid salts or vinyl acetate as monomers. For the production of liquid detergents in particular, the organic builder substances can be used in the form of aqueous solutions, preferably in the form of 30 to 50% by weight aqueous solutions. All the cited acids are generally used in the form of their water-soluble salts, in particular their alkali salts.

Such organic builder substances can be contained if desired in amounts of up to 40% by weight, in particular up to 25% by weight and preferably from 1% by weight to 8% by weight. Amounts close to the cited upper limit are preferably used in paste-form or liquid, in particular water-containing, detergents.

Polyphosphates in particular, preferably sodium triphosphate, are suitable as water-soluble inorganic builder materials. Crystalline or amorphous, water-dispersible alkali aluminosilicates in particular are used as water-insoluble inorganic builder materials, in amounts not exceeding 25% by weight, preferably from 3% by weight to 20% by weight, and especially in amounts from 5% by weight to 15% by weight. Of these, the crystalline sodium aluminosilicates in detergent quality are preferred, in particular zeolite A, zeolite P, and zeolite MAP, and optionally zeolite X. Amounts close to the cited upper limit are preferably used in solid, particulate detergents. Suitable aluminosilicates have in particular no particles with a particle size of more than 30 µm and preferably consist of at least 80% by weight of particles with a size of less than 10 µm. Their calcium-binding capacity is generally in the range from 100 to 200 mg of CaO per gram.

Further water-soluble inorganic builder materials can be present in addition or alternatively to the cited water-insoluble aluminosilicates and alkali carbonate. These include, apart from polyphosphates, such as sodium triphosphate, particularly the water-soluble crystalline and/or amorphous alkali silicate builders. Such water-soluble inorganic builder materials are present in the detergents preferably in amounts from 1% by weight to 20% by weight, particularly from 5% by weight to 15% by weight. Alkali silicates that can be used as builder materials preferably have a molar ratio of alkali oxide to $SiO_2$ of less than 0.95, particularly from 1:1.1 to 1:12 and can be amorphous or crystalline. Preferred alkali silicates are sodium silicates, particularly amorphous sodium silicates, with a molar ratio of $Na_2O$:$SiO_2$ of 1:2 to 1:2.8. Crystalline phyllosilicates of the general formula $Na_2Si_xO_{2x+1} \cdot yH_2O$, in which the so-called modulus x is a number from 1.9 to 4 and y is a number from 0 to 20, with preferred values for x being 2, 3, or 4, are preferably used as crystalline silicates, which can be present alone or in a mixture with amorphous silicates. Preferred crystalline phyllosilicates are those in which x assumes the values 2 or 3 in the cited general formula. In particular both β- and δ-sodium disilicates ($Na_2Si_2O_5 \cdot yH_2O$) are preferred. Virtually anhydrous crystalline alkali silicates of the aforementioned general formula prepared from amorphous alkali silicates, in which x denotes a number from 1.9 to 2.1, can also be used in detergents according to the invention. In a further preferred embodiment, a crystalline sodium phyllosilicate with a modulus of 2 to 3 is used, such as can be prepared from sand and soda. Sodium silicates with a modulus in the range from 1.9 to 3.5 are used in a further preferred embodiment. In a preferred embodiment of such detergents, a granular compound of alkali silicate and alkali carbonate is used, as is obtainable commercially under the name Nabion® 15, for example.

Suitable bleaching agents are those on a chlorine base, such as particularly alkali hypochlorite, dichloroisocyanuric acid, trichloroisocyanuric acid, and salts thereof, but particularly also those on a peroxygen base. Suitable peroxygen compounds are in particular organic peracids or peracid salts of organic acids, such as phthalimidopercaproic acid, perbenzoic acid, monoperoxyphthalic acid, and diperdodecane-dioic acid, as well as salts thereof, such as magnesium monoperoxyphthalate, hydrogen peroxide, and inorganic salts which give off hydrogen peroxide under washing conditions, such as perborate, percarbonate, and/or persilicate, and hydrogen peroxide inclusion compounds, such as $H_2O_2$-urea adducts. In this regard, hydrogen peroxide can also be generated with the aid of an enzymatic system, i.e., an oxidase and its substrate. If solid peroxygen compounds are to be used, they may be used in the form of powders or granules, which may also be encapsulated in a manner known in principle. Alkali percarbonate, alkali perborate monohydrate, or hydrogen peroxide in the form of aqueous solutions, containing 3% by weight to 10% by weight of hydrogen peroxide, is used especially preferably. If a detergent contains peroxygen compounds, these are present in amounts of preferably up to 25% by weight, particularly from 1% by weight to 20% by weight, and especially preferably from 7% by weight to 20% by weight.

In particular, compounds, which under perhydrolysis conditions produce optionally substituted perbenzoic acid and/or aliphatic peroxocarboxylic acids a having 1 to 12 C atoms, particularly 2 to 4 C atoms, can be used alone or in mixtures as bleach-activating compound, yielding peroxocarboxylic acids under perhydrolysis conditions. Bleach activators bearing O- and/or N-acyl groups in particular having the stated number of C atoms and/or optionally substituted benzoyl groups are suitable. Preferred are multiply acylated alkylenediamines, in particular tetraacetylethylenediamine (TAED), acylated glycolurils, in particular tetraacetylglycoluril (TAGU), acylated triazine derivatives, in particular 1,5-diacetyl-2,4-dioxohexahydro-1,3,5-triazine (DADHT), N-acylimides, in particular N-nonanoyl succinimide (NOSI), acylated phenol sulfonates or carboxylates or the sulfonic or carboxylic acids thereof, in particular n-nonanoyl- or isononanoyl- or lauryloxybenzenesulfonate (NOBS or iso-NOBS or LOBS), or decanoyloxybenzoate (DOBA), the formal carbonate derivatives thereof such as 4-(2-decanoyloxyethoxycarbonyloxyl)benzene sulfonate (DECOBS), acylated polyhydric alcohols, in particular triacetin, ethylene glycol diacetate, and 2,5-diacetoxy-2,5-dihydrofuran and acetylated sorbitol and mannitol and mixtures thereof (SORMAN), acylated sugar derivatives, in particular pentaacetyl glucose (PAG), pentaacetyl fructose, tetraacetyl xylose and octaacetyl lactose, acetylated, optionally N-alkylated glucamine and gluconolactone, and/or N-acylated lactams, for example, N-benzoylcaprolactam.

In addition to the compounds forming peroxocarboxylic acids under perhydrolysis conditions, other bleach-activating compounds may be present such as, for example, nitriles, from which perimidic acids form under perhydrolysis conditions. These include in particular aminoacetonitrile derivatives with a quaternized nitrogen atom according to the formula

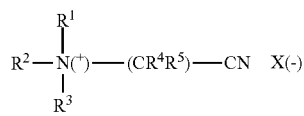

in which $R^1$ stands for —H, —$CH_3$, a $C_{2-24}$ alkyl or alkenyl group, a substituted $C_{1-24}$ alkyl or $C_{2-24}$ alkenyl group with at least one substituent from the group —Cl, —Br, —OH, —$NH_2$, —CN, and —$N^{(+)}$—$CH_2$—CN, an alkyl or alkenylaryl group with a $C_{1-24}$ alkyl group, or stands for a substituted alkyl or alkenylaryl group with at least one, preferably two, optionally substituted $C_{1-24}$ alkyl group(s) and optionally further substituents on the aromatic ring, $R^2$ and $R^3$ independently of one another are selected from —$CH_2$—CN, —$CH_2$—$CH_3$, —$CH_2$—$CH_2$—$CH_3$, —CH($CH_3$)—$CH_3$, —$CH_2$—OH, —$CH_2$—$CH_2$—OH, —CH(OH)—$CH_3$, —$CH_2$—$CH_2$—$CH_2$—OH, —$CH_2$—CH(OH)—$CH_3$, —CH(OH)—$CH_2$—$CH_3$, —($CH_2CH_2$—O)$_n$H with n=1, 2, 3, 4, 5, or 6, $R^4$ and $R^5$ independently of one another have a meaning indicated above for $R^1$, $R^2$, or $R^3$, whereby at least 2 of the mentioned groups, particularly $R^2$ and $R^3$, also with inclusion of the nitrogen atom and optionally further heteroatoms can be connected together with ring closure and then preferably form a morpholino ring, and X is a charge-equalizing anion, preferably selected from benzene sulfonate, toluene sulfonate, cumol sulfonate, $C_{9-15}$ alkylbenzene sulfonates, $C_{1-20}$ alkyl sulfate, $C_{8-22}$ carboxylic acid methyl ester sulfonates, sulfates, hydrogen sulfate, and mixtures thereof, can be used. Oxygen-transferring sulfonimines and/or acylhydrazones can also be used.

The presence of bleach-catalyzing transition metal complexes is also possible. These are preferably selected from among cobalt, iron, copper, titanium, vanadium, manganese, and ruthenium complexes. Ligands suitable in such transition metal complexes are both inorganic and organic compounds, which include, apart from carboxylates, particularly compounds with primary, secondary, and/or tertiary amine and/or alcohol functions, such as pyridine, pyridazine, pyrimidine, pyrazine, imidazole, pyrazole, triazole, 2,2'-bispyridylamine, tris-(2-pyridylmethyl)amine, 1,4,7-triazacyclononane, 1,4,7-trimethyl-1,4,7-triazacyclononane, 1,5,9-trimethyl-1,5,9-triazacyclododecane, (bis-((1-methylimidazol-2-yl)methyl))-(2-pyridylmethyl)amine, N,N'-(bis-(1-methylimidazol-2-yl)methyl)ethylenediamine, N-bis-(2-benzimidazolylmethyl)aminoethanol, 2,6-bis-(bis-(2-benzimidazolylmethyl)aminomethyl)-4-methylphenol, N,N,N',N'-tetrakis-(2-benzimidazolylmethyl)-2-hydroxy-1,3-diaminopropane, 2,6-bis-(bis-(2-pyridylmethyl)aminomethyl)-4-methylphenol, 1,3-bis-(bis-(2-benzimidazolylmethyl)aminomethyl)benzene, sorbitol, mannitol, erythritol, adonitol, inositol, lactose, and optionally substituted salens, porphins, and porphyrins. The inorganic neutral ligands include in particular ammonia and water. If not all coordination sites of the transition metal central atom are occupied by neutral ligands, the complex contains further, preferably anionic, and among these particularly mono- or bidentate ligands. These include in particular halides such as fluoride, chloride, bromide, and iodide, and the ($NO_2$)⁻ group, i.e., a nitro ligand or a nitrito ligand. The ($NO_2$)⁻ group can also be bound to a transition metals to form a chelate or it can bridge two transition metals asymmetrically or with an bond. Apart from the mentioned ligands, the transition metal complexes may bear still further ligands, generally with a simpler structure, particularly mono- or polyvalent anionic ligands.

Examples are nitrate, acetate, trifluoracetate, formate, carbonate, citrate, oxalate, perchlorate, and complex anions such as hexafluorophosphate. The anionic ligands are intended to provide the charge equalization between the transition metal central atom and the ligand system. Oxo ligands, peroxo ligands, and imino ligands may also be present. Such ligands in particular may also have a bridging effect so that polynuclear complexes are formed. In the case of bridged binuclear complexes, the two metal atoms in the complex need not be the same. Binuclear complexes in which the two transition metal central atoms have different oxidation numbers may also be used. In the absence of anionic ligands or if the presence of anionic ligands does not lead to charge equalization in the complex, the transition metal complex compounds to be used in accordance with the invention contain anionic counterions which neutralize the cationic transition metal complex. These anionic counterions include in particular nitrate, hydroxide, hexafluorophosphate, sulfate, chlorate, perchlorate, halides such as chloride, or the anions of carboxylic acids, such as formate, acetate, oxalate, benzoate, or citrate. Examples of transition metal complex compounds that may be used are $Mn(IV)_2(\mu\text{-}O)_3$ (1,4,7-trimethyl-1,4,7-triazacyclononane)dihexafluorophosphate, [N,N'-bis[(2-hydroxy-5-vinylphenyl)methylene]-1,2-diaminocyclohexane]manganese(M) chloride, [N,N'-bis[(2-hydroxy-5-nitrophenyl)methylene]-1,2-diaminocyclohexane]manganese(III) acetate, [N,N'-bis[(2-hydroxyphenyl)methylene]-1,2-phenylendiamine] manganese(III) acetate, [N,N'-bis[(2-hydroxyphenyl)methylene]-1,2-diaminocyclohexane]manganese(III) chloride, [N,N'-bis[(2-hydroxyphenyl)methylene]-1,2-diaminoethane]manganese (III) chloride, [N,N'-bis[(2-hydroxy-5-sulfonatophenyl)methylene]-1,2-diaminoethane] manganese(III) chloride, manganese oxalate complexes, nitropentaammine-cobalt(III) chloride, nitritopentaammine-cobalt(III) chloride, hexaammine-cobalt(III) chloride, chloropentaammine-cobalt(III) chloride, and the peroxo complex $[(NH_3)_5Co\text{—}O\text{—}O\text{—}Co(NH_3)_5]Cl_4$.

Enzymes suitable for use in the detergents are those from the class of amylases, proteases, lipases, cutinases, pullulanases, hemicellulases, cellulases, oxidases, laccases, and peroxidases, and mixtures thereof. Particularly suitable are enzymatic active substances obtained from fungi or bacteria, such as *Bacillus subtilis, Bacillus licheniformis, Bacillus lentus, Streptomyces griseus, Humicola lanuginosa, Humicola insolens, Pseudomonas pseudoalcaligenes, Pseudomonas cepacia*, or *Coprinus cinereus*. The enzymes may be adsorbed onto supports and/or encapsulated in shell-forming substances to protect them against premature inactivation. They are contained in the detergents or cleaning agents according to the invention preferably in amounts up to 5% by weight, particularly from 0.2% by weight to 4% by weight. If the detergent according to the invention contains protease, it preferably has a proteolytic activity in the range from around 100 PU/g to around 10,000 PU/g, in particular 300 PU/g to 8000 PU/g. If a number of enzymes are to be used in the detergent according to the invention, this can be carried out by incorporating the two or more separate enzymes or enzymes formulated separately in a known manner or two or more enzymes formulated together in granules.

Organic solvents that can be used in addition to water in detergents, particularly if they are in liquid or paste form, include alcohols having 1 to 4 C atoms, particularly methanol, ethanol, isopropanol, and tert-butanol, diols having 2 to 4 C atoms, particularly ethylene glycol and propylene glycol, and mixtures thereof, and ethers derivable from the cited classes of compounds. Such water-miscible solvents are preferably present in the detergents according to the invention in amounts not exceeding 30% by weight, in particular from 6% by weight to 20% by weight.

To set a desired pH that is not established automatically by mixing the other components, the detergents according to the invention can contain system-compatible and environmentally compatible acids, in particular citric acid, acetic acid, tartaric acid, malic acid, lactic acid, glycolic acid, succinic acid, glutaric acid, and/or adipic acid, but also mineral acids, in particular sulfuric acid, or bases, in particular ammonium or alkali hydroxides. Such pH regulators are contained in the detergents according to the invention in amounts preferably not exceeding 20% by weight, particularly from 1.2% by weight to 17% by weight.

Graying inhibitors have the task of keeping dirt, dissolved out of the textile fibers, suspended in the liquor. Water-soluble colloids of a mainly organic nature are suitable for this purpose, for example, starch, size, gelatin, salts of ether carboxylic acids or ether sulfonic acids of starch or cellulose or salts of acidic sulfuric acid esters of cellulose or starch. Water-soluble polyamides containing acidic groups are also suitable for this purpose. Derivatives of starch other than those stated above, for example, aldehyde starches, may be used furthermore. Cellulose ethers, such as carboxymethylcellulose (Na salt), methylcellulose, hydroxyalkylcellulose, and mixed ethers, such as methylhydroxyethylcellulose, methylhydroxypropylcellulose, methylcarboxymethylcellulose, and mixtures thereof, are preferably used, for example, in amounts from 0.1 to 5% by weight, based on the detergent.

Detergents may contain as optical brighteners, for example, derivatives of diaminostilbene disulfonic acid or the alkali metal salts thereof, although they preferably contain no optical brighteners for use as a color detergent. Suitable are, for example, salts of 4,4'-bis(2-anilino-4-morpholino-1,3,5-triazinyl-6-amino)stilbene-2,2'-disulfonic acid or compounds of similar structure which, instead of the morpholino group, bear a diethanolamino group, a methylamino group, an anilino group, or a 2-methoxyethylamino group. Brighteners of the substituted diphenylstyryl type furthermore may be present, for example, the alkali salts of 4,4'-bis(2-sulfostyryl)diphenyl, 4,4'-bis(4-chloro-3-sulfostyryl)diphenyl, or 4-(4-chlorostyryl)-4'-(2-sulfostyryl)diphenyl. Mixtures of the aforementioned optical brighteners may also be used.

Especially for use in a machine method, it may be advantageous to add conventional foam inhibitors to the detergents. Suitable foam inhibitors are, for example, soaps of natural or synthetic origin, which have a high proportion of $C_{18}$-$C_{24}$ fatty acids. Suitable nonsurfactant foam inhibitors are, for example, organopolysiloxanes and mixtures thereof with microfine, optionally silanized silicic acid, as well as paraffins, waxes, microcrystalline waxes, and mixtures thereof with silanized silicic acid or bis-fatty acid alkylene diamides. Mixtures of different foam inhibitors are also used advantageously, for example, mixtures of silicones, paraffins, or waxes. The foam inhibitors, in particular foam inhibitors containing silicone and/or paraffin, are preferably bound to a granular carrier substance soluble or dispersible in water. Mixtures of paraffins and distearyl ethylene diamide are particularly preferred here.

The production of solid detergents presents no difficulties and may occur in a known manner, for example, by spray drying or granulation, with enzymes and other possible thermally sensitive constituents such as, for example, bleaching agents optionally being added separately later. A method having an extrusion step is preferred for producing detergents with an elevated bulk density, particularly in the range from 650 g/L to 950 g/L.

To produce detergents in tablet form, which may be monophasic or multiphasic, single-colored or multicolored, and in particular may consist of one layer or of many layers, particularly two layers, one preferably proceeds such that all ingredients, optionally for each layer, are mixed together in a mixer and the mixture is compressed by means of conventional tablet presses, for example, eccentric presses or rotary presses, with pressing forces in the range from approximately 50 to 100 kN, preferably at 60 to 70 kN. In particular in the case of multilayer tablets, it may be advantageous for at least one layer to be precompressed. This is preferably carried out at pressing forces between 5 and 20 kN, in particular at 10 to 15 kN. Tablets that are breaking-resistant and yet dissolve sufficiently rapidly under conditions of use and with breaking and bending strengths usually from 100 to 200 N, but preferably of above 150 N are easily obtained in this way. A tablet produced in this manner preferably has a weight from 10 g to 50 g, in particular from 15 g to 40 g. The shape of the tablets is arbitrary and may be round, oval, or angular, intermediate shapes also being possible. Corners and edges are advantageously rounded. Round tablets preferably have a diameter from 30 mm to 40 mm. In particular, the size of angular or cuboidal tablets, which are predominantly introduced by means of the dispenser of a washing machine, depends on the geometry and volume of said dispenser. Preferred embodiments have, for example, a base area of (20 to 30 mm)×(34 to 40 mm), in particular of 26×36 mm or of 24×38 mm.

Liquid or pasty detergents in the form of solutions containing conventional solvents are generally produced by simply mixing the constituents, which may be introduced into an automatic mixer in bulk or as a solution.

EXAMPLES

Example 1

Preparation a) Analogous to the method described in Chem. Engin. J. 149 (2009) 263-272, 4.05 g (20 mmol) of ethylene glycol monomethacrylate, 0.34 g (4 mmol) of methacrylic acid, and 2.18 g (3.2 mmol) of disodium-8-anilino-5-[[4-[(3-sulfonatophenyl)diazenyl]naphthalen-1-yl]diazenyl]naphthalene-1-sulfonate (Acid Blue 113) in 100 mL of dimethylformamide were charged under a nitrogen atmosphere and stirred for 2 hours at room temperature. Next, 22 mg of azoisobutyronitrile was added; the reaction mixture was degassed for 15 minutes in the ultrasonic bath and stirred for 12 hours at 75° C. The residue was separated, washed with acetone and hot water, and extracted with 500 mL of methanol in a Soxhlet extractor for 8 hours. After drying, 3.5 g of a brittle, dark purple product (PM1) was obtained.

For comparison, the corresponding but not molecularly imprinted polymer (PV1) was prepared under otherwise the same conditions from the same monomer amounts without the dye and the extraction step.

b) A solution of 0.07 g (0.813 mmol) of methacrylic acid, 0.8 g (4.07 mmol) of ethylene glycol dimethacrylate, 0.173 g (0.254 mmol) of the dye Acid Blue 113, and 10.51 mg (0.064 mmol) of azoisobutyronitrile in 5 mL of chloroform was degassed for 10 minutes in the ultrasonic bath and stirred for 24 hours at 50° C. under a nitrogen atmosphere. The resulting polymer was comminuted and extracted with 200 mL of acetic acid/methanol (volume ratio of 1:9) in a Soxhlet extractor for 24 hours and then with 100 mL of methanol. The molecularly imprinted polymer PM2 was obtained.

For comparison, the corresponding but not molecularly imprinted polymer (PV2) was prepared under otherwise the same conditions from the same monomer amounts without the dye and the extraction step.

c) A solution of 0.225 g (0.813 mmol) of N,N-dimethylaminoethyl methacrylate-$H_2SO_4$ salt, 0.8 g (4.07 mmol) of ethylene glycol dimethacrylate, 0.173 g (0.254 mmol) of the dye Acid Blue 113, and 15.75 mg (0.064 mmol) of 2,2-azadi-2,4-dimethylvaleronitrile in 5 mL of acetonitrile was degassed for 10 minutes in the ultrasonic bath and stirred for 24 hours at 50° C. under a nitrogen atmosphere. The resulting polymer was comminuted and extracted with 200 mL of acetic acid/methanol (volume ratio of 1:9) for 24 hours and then with 100 mL of methanol for 6 hours in a Soxhlet extractor. The molecularly imprinted polymer PM3 was obtained.

For comparison, the corresponding but not molecularly imprinted polymer (PV3) was prepared under otherwise the same conditions from the same monomer amounts without the dye and the extraction step.

d) A solution of 0.08 g (0.813 mmol) of methyl methacrylate, 0.8 g (4.07 mmol) of ethylene glycol dimethacrylate, 0.066 g (0.254 mmol) of indigo, and 10.51 mg (0.064 mmol) of azoisobutyronitrile in 5 mL of toluene was degassed for 10 minutes in the ultrasonic bath and stirred for 24 hours at 50° C. under a nitrogen atmosphere. The resulting polymer was comminuted and washed in succession with 100 mL of methanol, 100 mL of methanol/0.1 M hydrochloric acid (volume ratio of 9:1), and 100 mL of methanol and extracted with methyl chloride/acetic acid (volume ratio of 1:9) for 48 hours and then with 100 mL of methanol for 24 hours in a Soxhlet extractor. The molecularly imprinted polymer PM4 was obtained.

For comparison, the corresponding but not molecularly imprinted polymer (PV4) was prepared under otherwise the same conditions from the same monomer amounts without the dye and the extraction step.

Example 2

Absorption Test

An aqueous solution of the dye Acid Blue 113, which had an extinction of 0.25 at a wavelength of 564 nm, after addition in each case of the amounts (in mg/L), stated in the following table, of PM1 or PV1 still had the extinctions also stated there at the same wavelength ( ).

| Polymer | 35 mg/L | 64 mg/L |
|---|---|---|
| PM1 | 0.072 | 0.034 |
| PV1 | 0.121 | 0.093 |

It is evident that the dye is removed from the solution much better by the molecularly imprinted polymer than by the polymer that was not molecularly imprinted.

Example 3

Release Test

In each case 1 mg/mL of the polymer PV1 or PM1 prepared in Example 1, which was previously saturated with dye in an excess of the dye Acid Blue 113 in the same surfactant mixture with buffer and was then decanted, was added to a surfactant mixture (in each case 7.5% Dehydol LT 7 and alkylbenzene sulfonic acid) in buffer (water with 1.5% by weight of citric acid and 1.8% by weight of sodium hydroxide). The resulting extinction at a wavelength of 564 nm is given in the following table ( ).

| Polymer | Extinction |
|---------|------------|
| PM1 | 0.102 |
| PV1 | 0.131 |

It is evident that the dye is retained much better by the molecularly imprinted polymer than by the polymer that was not molecularly imprinted.

Example 4

Dye Transfer Inhibition Test

A Staining Scale Rating (SSR), which is based on ISO 105-A04, was carried out to determine the dye transfer-inhibiting properties. To this end, a white fabric (6×16 cm of a standard polyamide fabric) was washed for 30 minutes at 60° C. with a color-releasing fabric stained with Acid Blue 113 (concentration of the color-releasing fabric of 3 g/L) with use of a dye transfer inhibitor-free detergent composition W (dosage of 5 g/L) and addition of 5 g/L of the molecularly imprinted polymer PM1 or of the comparison polymer PV1 in a Linitest device, then rinsed with water, and dried hanging at room temperature. Next, the extent of the staining of the fabric was determined spectrophotometrically. In addition, for comparison the dye transfer inhibitor-free detergent composition W was tested in the same way without the addition of polymer.

The extent of staining was given in values from 1 (extensive staining) to 5 (no staining). It is clear from the SSR reproduced in the following table that the detergent of the invention has better dye transfer-inhibiting properties:
SSR

| w | w + PV1 | w + PM1 |
|---|---------|---------|
| 1.9 | 2.8 | 3.6 |

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention, it being understood that various changes may be made in the function and arrangement of elements described in an exemplary embodiment without departing from the scope of the invention as set forth in the appended claims and their legal equivalents.

What is claimed is:

1. A textile washing detergent with dye transfer-inhibiting properties, comprising:
   a.) molecularly imprinted polymers, of ethylenically unsaturated monomers, wherein the molecularly imprinted polymers were obtained by polymerization of the monomers in the presence of dyes in a dye-monomer matrix resulting in a polymer matrix, and wherein the dyes were subsequently removed from the polymer matrix yielding the molecularly imprinted polymers;
   b.) one or more surfactants selected from the group consisting of anionic surfactants, nonionic surfactants, cationic surfactants, zwitterionic surfactants, and amphoteric surfactants;
   c.) at least one water-soluble and/or water-insoluble builder.

2. A detergent according to claim 1, wherein the ethylenically monomers comprise mono- or polyethylenically unsaturated mono-, di-, or tricarboxylic acids, and mixtures thereof.

3. A detergent according to claim 1, characterized in that it contains the molecularly imprinted polymer in amounts from 0.01% by weight to 5% by weight.

4. The detergent according to claim 1, characterized in that one or more additional monomers selected from the group consisting of acrylamide, methacrylamide, 2-vinylpyridine, 4-vinylpyridine, N,N,N-trimethyl-N-(4-vinylbenzyl)ammonium chloride, vinylpyrrolidone, vinylimidazole, N-benzene-N'-vinylimidazolinium bromide, divinylbenzene, methylenebisacrylamide, styrene, cyanostyrene, and acrylonitrile are used for preparing the polymers.

5. The detergent according to claim 1, wherein the dyes are selected from the group consisting of: azo dyes, reactive dyes, direct dyes, pigment dyes, and mixtures thereof.

6. A method for washing textiles in surfactant-containing aqueous solutions, wherein textiles are contacted with the detergent according to claim 1 in an aqueous solution.

* * * * *